United States Patent [19]
Stone et al.

[11] Patent Number: 5,486,319
[45] Date of Patent: Jan. 23, 1996

[54] TIRE CURE CONTROL SYSTEM AND METHOD

[75] Inventors: W. Ross Stone, La Jolla; Robert L. Palmer, San Diego, both of Calif.; Virgil D. Mochel, Wadsworth; Robert P. Karpinski, North Canton, both of Ohio

[73] Assignee: Bridgestone/Firestone, Inc., Akron, Ohio

[21] Appl. No.: 174,819

[22] Filed: Dec. 29, 1993

[51] Int. Cl.⁶ .............................. B29C 35/04; G01N 22/00
[52] U.S. Cl. .................. 264/406; 264/40.5; 264/40.6; 264/315; 264/326; 264/40.3; 324/639; 425/29; 425/174.6; 425/143
[58] Field of Search .................. 264/40.1, 22, 40.6, 264/315, 326, 40.2, 40.5; 425/174, 143, 174.4, 174.6, 29; 324/637, 639

[56] References Cited

U.S. PATENT DOCUMENTS

| | | | |
|---|---|---|---|
| 3,155,898 | 11/1964 | Chope | 324/639 |
| 3,234,462 | 2/1966 | Holdsworth . | |
| 3,265,873 | 8/1966 | Sawyer | 324/639 |
| 3,565,870 | 2/1971 | Iino | 264/40.1 |
| 3,579,626 | 5/1971 | Brittain | 264/315 |
| 3,648,164 | 3/1972 | Searle et al. | 324/639 |
| 3,649,729 | 3/1972 | Davis et al. | 264/315 |
| 3,659,974 | 5/1972 | Neugroschi . | |
| 3,718,721 | 2/1973 | Gould et al. | 264/326 |
| 3,791,792 | 2/1974 | Lindsay . | |
| 3,819,915 | 6/1974 | Smith | 264/40.1 |
| 3,836,614 | 9/1974 | Neugroschl | 264/40.1 |
| 3,980,743 | 9/1976 | Smith . | |
| 4,143,114 | 3/1979 | Smith et al. | 264/326 |
| 4,208,562 | 6/1980 | Perreault . | |
| 4,344,142 | 8/1982 | Diehr, II et al. . | |
| 4,373,092 | 2/1983 | Zsolnay . | |
| 4,399,100 | 8/1983 | Zsolnay et al. . | |
| 4,455,268 | 6/1984 | Hinrichs et al. . | |
| 4,490,325 | 12/1984 | Mattson et al. | 264/315 |
| 4,496,697 | 1/1985 | Zsolnay et al. . | |
| 4,677,522 | 6/1987 | Persson . | |
| 4,710,550 | 12/1987 | Kranbuehl . | |
| 4,721,590 | 1/1988 | Trapp | 264/315 |
| 4,723,908 | 2/1988 | Kranbuehl . | |
| 4,868,769 | 9/1989 | Persson . | |
| 4,921,415 | 5/1990 | Thomas, III et al. . | |
| 5,019,318 | 5/1991 | Mattson | 264/315 |
| 5,177,444 | 1/1993 | Cutmore | 324/637 |

OTHER PUBLICATIONS

Skega, "A Novel Method of Measuring Cure—Dielectric Vulcametry", *Plastics and Rubber Processing and Applications* 7, pp. 111–125 (1987).

Desanges et al., "Changes In The Electrical Properties Of Natural Rubber/Carbon Black Compounds During Vulcanization", *Revue Generale du Caoutchoue*, vol. 34, No. 12, pp. 1260–1267 (Dec. 1957).

Waring, "Power Factor and Vulcanisation", *Transactions, I.R.I.*, pp. 16–37, 1951.

Khastgir et al., "Dielectric Behaviou and Sulphur Vulcanization of the Crosslinked Butyl (XL–50 Rubber", 1983.

Micromet Instruments, Inc., Brochure entitled "The Dielectric Source", pp. 3, 4 and 6, Summer 1989.

(List continued on next page.)

*Primary Examiner*—Mathieu D. Vargot
*Attorney, Agent, or Firm*—David A. Thomas; Daniel L. Hall

[57] ABSTRACT

A tire cure control system and method characterized by a computer-based data acquisition and process control unit that uses non-invasive, direct cure measurements to adjust the length of cure so that all cured articles such as tires will be cured to the same extent in the minimum amount of time, thereby to maximize production while providing uniformly cured products. The unit generally includes at least one microwave probe, although preferably multiple microwave probes, placed in the mold and a processor to process probe data and to initiate a control action principally initiating a mold opening sequence at the optimal time. Initiation of the mold opening sequence at least in part is based upon a measurement of the time rate of change of the attenuation of microwave energy caused by the curing rubber compound in the mold.

19 Claims, 4 Drawing Sheets

OTHER PUBLICATIONS

Micromet Instruments, Inc., "Measurements In Action" (No date).

Micromet Instruments, Inc., "Principles Of Dielectrometry" (No date).

Micromet Instruments, Inc., Brochure entitled "Take Control Of Your Polymer Processing" (No date).

Siemon et al., "Establishing Cure Characteristics of Polar Elastomers Using Dielectric Analysis", *Elastomerics*, pp. 25–28, Mar. 1982.

Hewlett Packard, Brochure entitled "Convenient Non–Destructive Dielectric Measurements", 1990.

Senturia et al., "Dielectric Analysis of Thermoset Cure", Office of Naval Research, Contract N00014–84–K–0274, Task No. NR 039–260, Technical Report No. 4, Oct. 7, 1985.

Yalof et al., "Dielectric Monitoring of Cure", *Rubber Age*, Part I, pp. 31–35, Jun., 1977 and Part II, pp. 43–49, Jul., 1976.

Micromet Instruments, Inc., Leaflet entitled "Come See the Latest in Cure Monitoring and Control . . . ", Sep. 2, 1991.

Spatial Dynamics Applications, Inc., Brochure entitled "Measure Dielectric Constants" (1990).

Micromet Instruments, Inc., Brochure entitled "The Eumetric System III Microdielectrometer . . . " (No date).

Spatial Dynamics Applications, Inc., Brochure entitled "Measure Dielectric Constants & Loss Tangents", 1990.

Spatial Dynamics Applications, Inc., Leaflet entitled "Application Note" (1990).

Kirk–Othmer, "Encyclopedia Of Chemical Technology", Third Edition, vol. 20, pp. 374–386, (1982).

TIRE CURE CONTROL SYSTEM AND METHOD

The invention herein described relates generally to the curing of rubber compounds and especially rubber compounds containing carbon black or similar reinforcing agents or fillers. More particularly, the invention relates to a system and method for accurately controlling the molding time for vehicle tires and similar vulcanized products. Because the invention was conceived and developed for controlling the cure of vehicle tires, and is particularly useful for such, it will be described herein chiefly in this context. However, the underlying principles of the invention could be adapted to other processes for curing rubber compounds with advantageous results.

Background

In the manufacture of vehicle tires, widespread practice has been to use automatic tire shaping and curing presses such as the "Bag-O-Matic" presses manufactured by the McNeil Corporation of Akron, Ohio, U.S.A. and the "Autoform" presses manufactured by the NRM Corporation of Akron, Ohio, U.S.A. These presses, which are well known in the art, generally employ separable mold halves or parts (including segmented mold parts) with center shaping and curing mechanisms utilizing bladders into which shaping, heating and cooling fluids or media are introduced for shaping, molding and curing the tires which are composed of complex compounds of rubber, process accelerators, carbon black and other materials that are cross-linked in the presence of sulfur during the curing process.

The aforesaid tire shaping and curing presses typically are controlled by a mechanical timer which cycles the presses through various molding steps during which the tire is shaped, heated and in some processes cooled prior to unloading from the press. During the curing process the tire is subjected to high pressure and high temperature for a preset period of time intended to ensure sufficient cure of the tire to allow it to be removed from the mold without deleterious effect. The cure process usually continues to completion outside the press. Problems could arise when the pressure and more significantly the temperature varies during the curing process. This variance could result in the tires being overcured or undercured. The extent of cure also could be affected by the composition and aging history of the uncured tire as well as variance in geometry from tire to tire.

Because of these variables, and since undercuring is more detrimental than overcuring, the practice in the industry has been to set the cure time at the shortest time necessary to ensure that all tires will be adequately cured. This results in most tires being overcured and, consequently, a non-optimum cure time for the entire distribution of tires cured in the mold. This overcuring of almost all of the tires also negatively impacts production efficiency and tire durability.

Attempts have been made to control automatically the curing of polymeric materials by sensing the capacitive characteristics of a polymer undergoing cure. As reported in the literature, the cure state has an influence on dielectric constant and dissipation factor. However, attempts to measure these factors during a tire molding process have shown them to be temperature and pressure dependent. That is, they vary not only as a function of cure state but also as a function of pressure and especially temperature. Further, it is known in the an that the dielectric constant and loss tangent are frequency dependent and will vary as a function of the excitation signal used in the measuring process. Thus, cure state is extremely difficult to determine in an environment where all the dependent parameters are varying according to a changing time, temperature and pressure profile.

Consequently, a need exists for more accurate and reliable control of the curing process, thereby to obtain more uniformly and optimally cured tires as well as increased production by reducing to a minimum the amount of time a tire spends in the tire press. Although various attempts have been made in the past to satisfy this need, none have achieved widespread acceptance and use.

Summary of the Invention

The present invention provides a tire cure control system and method characterized by a computer-based data acquisition and process control unit that uses noninvasive, direct cure measurements to adjust the length of cure so that all cured articles such as tires will be cured to the same extent in the minimum amount of time, thereby to maximize production while providing uniformly cured products. The unit generally comprises at least one microwave probe, although preferably multiple microwave probes, placed in the mold and a processor to process probe data and to initiate a control action principally initiating a mold opening sequence at the optimal time. Initiation of the mold opening sequence at least in part is based upon a measurement of the time rate of change of the attenuation of microwave energy caused by the curing rubber compound in the mold. Reliance is had on an observed phenomenon that the rate of change of attenuation versus time correlates with the percentage cure over approximately the 2–20% range. The rate of change of attenuation versus time is monitored and when a target value is reached indicating that a certain percentage of cure has been reached, the mold opening sequence is initiated. The invention has particular application to the curing of rubber compounds containing a significant quantity of reinforcing agents or fillers including, in particular, carbon black or silica, and especially rubber compounds containing about 20–50 parts carbon black to 100 parts rubber (natural and/or synthetic) by weight.

According to one aspect of the invention, a method for molding an article made of a rubber compound containing a reinforcing agent or filler (preferably carbon black) comprises the steps of (a) closing a mold with the rubber compound therein, (b) applying heat to the rubber compound to initiate curing of the rubber compound, (c) passing a microwave signal through the rubber compound, (d) measuring the attenuation of the microwave signal, (e) calculating from the microwave attenuation measurements the rate of change of microwave attenuation, (f) using the rate of change of microwave attenuation to determine when to issue a mold opening signal, and (g) automatically initiating a mold opening sequence in response to the mold opening signal after which the molded article is removed from the mold.

In accordance with a preferred embodiment of the invention, the rate of change of microwave attenuation is used to determine a remaining period of time before issuing the mold opening signal and then issuing the mold opening signal upon elapsing of such remaining period of time. Preferably the voltage attenuation of the microwave signal is measured by a plurality of probes at respective different locations in the mold, although current may instead be measured. The probe output that exhibits the greatest rate of change relative to the other probes near the end of the cure cycle preferably is used to determine when to issue the mold opening signal.

According to another aspect of the invention, a method of vulcanizing a rubber tire in a closed mold having a generally toroidal mold cavity wherein a green tire is expanded in the mold by supplying a pressure fluid to the interior of the green tire, comprises the steps of (a) in a first stage supplying high pressure steam to the interior of the green tire to shape and heat the green tire, (b) in a second stage circulating hot media through the interior of the green tire, (c) in a third stage shutting off outward flow of hot media from the interior of the green tire while supplying hot media to the interior of the green tire, and (d) in a fourth stage removing the hot media from the interior of the tire and opening the mold to permit removal of the tire, and wherein the first and second stages are of fixed duration and the duration of the third stage is based on a selected characteristic of the tire measured during the curing thereof. Preferably the selected characteristic is the rate of change of attenuation of a microwave signal passed through the tire.

According to a further aspect of the invention, a system for vulcanizing a tire or other rubber product containing a reinforcing agent or filler (preferably carbon black) in a closed mold comprises at least one microwave probe proximate the surface of the mold cavity and having an input and an output, means for applying a microwave signal to the input of the probe, means connected to the output of the probe for measuring the microwave signal at the output of the probe, and means for comparing the amplitudes of the microwave signal at the input and output of the probe, whereby the attenuation of the microwave signal may be determined. In such a system for vulcanizing a rubber tire in a closed mold having a generally toroidal mold cavity, a preferred probe, herein called a bead probe, includes an elongate conductive element extending generally parallel to the region of the mold cavity against which a bead of the tire is formed. Preferably the elongate conductive element has an arc length greater than 90°. Additionally or alternatively, there may be provided a plurality of tread probes disposed in the region of the mold cavity against which the tread of the tire is formed, each tread probe including a pair of wires proximate the surface of the mold cavity with the means for applying a signal connected to one of the wires and the means for measuring being connected to the other wire. In a preferred embodiment, the bead probe includes at least one wire potted in a groove formed in the surface of the mold cavity whereas the tread probe wires extend into the mold cavity in a direction substantially perpendicular to the surface of the mold cavity.

According to still another aspect of the invention, a method of molding a rubber compound containing a reinforcing agent or filler (preferably carbon black) comprises the steps of (a) closing a mold with the rubber compound therein, (b) applying heat to the rubber compound to initiate curing of the rubber compound, (c) measuring a characteristic of the rubber compound having relation to the state of cure of the rubber compound by passing a microwave signal having a frequency of at least 1 Ghz through the rubber compound, (d) determining from the measured characteristic an optimal time to initiate a mold opening sequence, and (e) automatically initiating a mold opening sequence at the optimal time.

According to a yet another aspect of the invention, a non-destructive quality assurance method for determining the state of cure of a rubber product containing a reinforcing agent or filler (preferably carbon black) during curing thereof in a mold comprises the steps of (a) passing a microwave signal through the rubber product, (b) measuring the attenuation of the microwave signal, (c) calculating from the microwave attenuation measurements the rate of change of microwave attenuation, and (d) using the rate of change of microwave attenuation to obtain an indication of the state of cure of the rubber product.

The foregoing and other features of the invention are hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION

Figure 1:
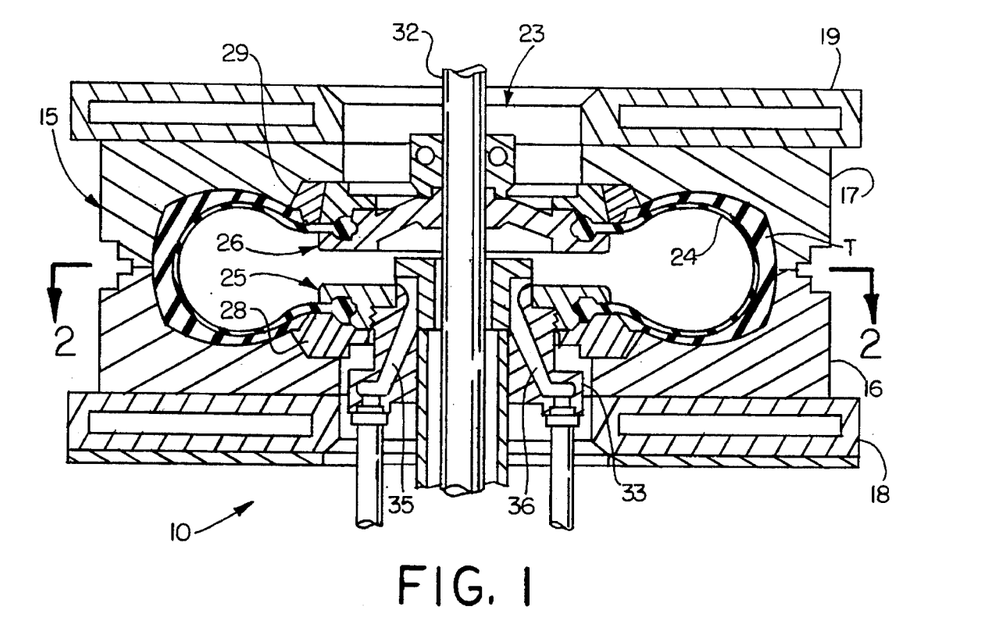
FIG. 1 is a partial vertical cross-sectional view of a tire shaping and curing press.
Figure 2:
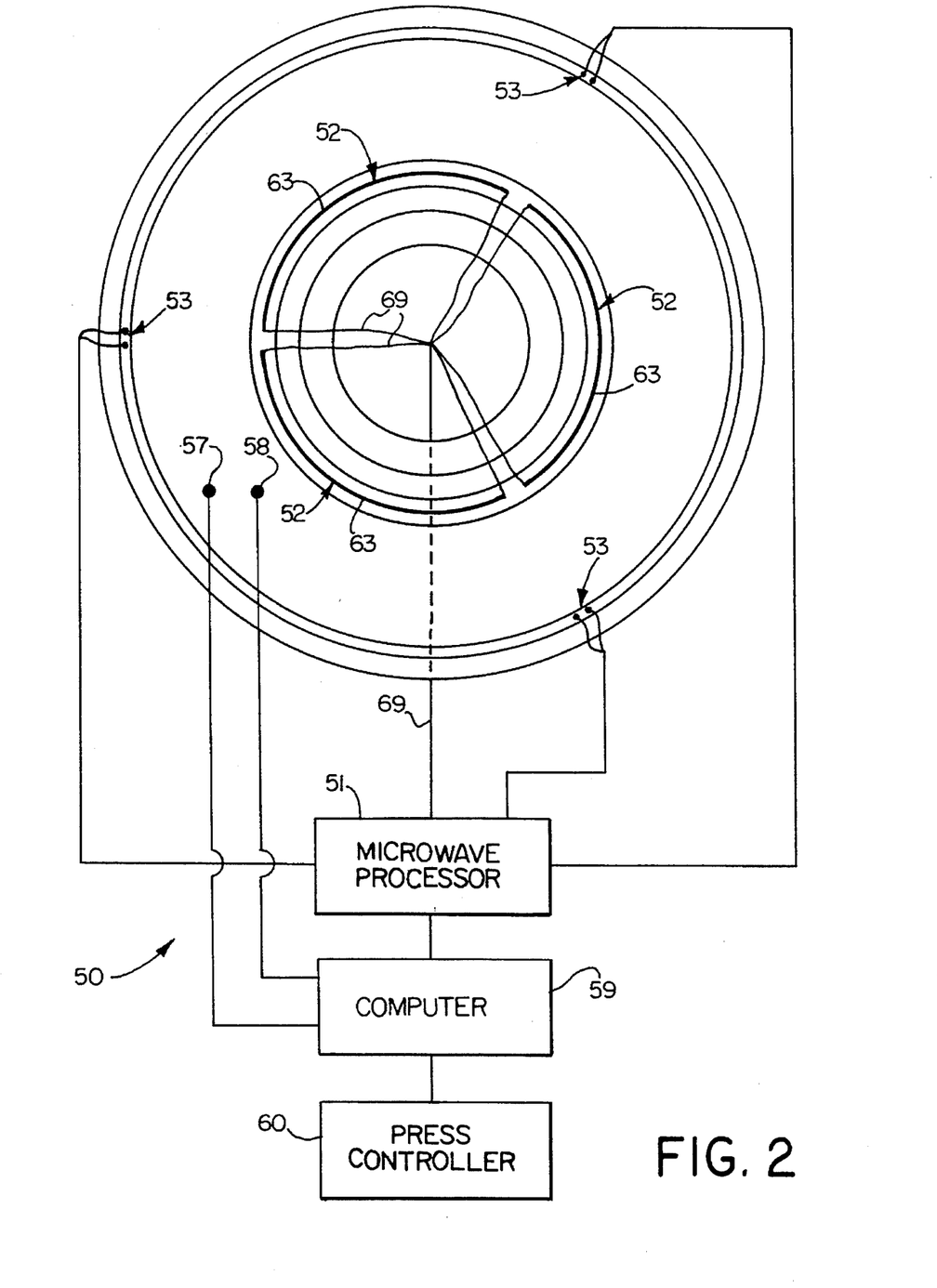
FIG. 2 is a diagrammatic plan view of the lower mold section of the FIG. 1 press and associated system components.
Figure 3:
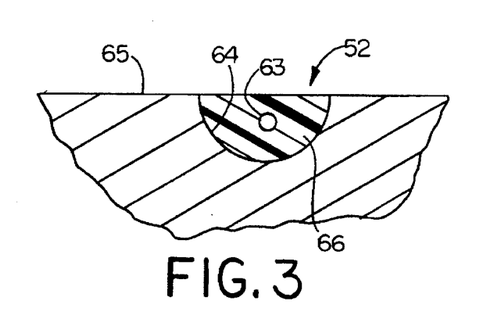
FIG. 3 is a partial sectional view of a tire mold showing a bead probe according to the invention.
Figure 4:
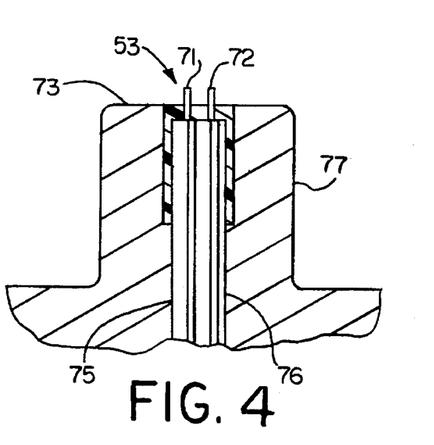
FIG. 4 is a partial sectional view of a tire mold showing a tread probe according to the invention.

Referring now in greater detail to the drawings, FIG. 1 shows a portion of a tire shaping and curing press indicated generally by reference numeral 10. As schematically illustrated in FIG. 2, the tire curing press 10 is equipped with multiple microwave probes that enable non-invasive, direct cure measurements to be made for use in adjusting the cure time of a tire in the press. FIGS. 3 and 4 show in greater detail preferred forms of probes useful in practicing the invention.

The Tire Press-FIG. 1

As seen in FIG. 1, the illustrated tire curing press 10 comprises a conventional-type tire mold 15 for shaping and curing an uncured tire, also referred to as a green tire. The tire mold includes separable mold pans or sections 16 and 17. The curing press may be of the commonly used dual cavity type, in which case there would be two such tire molds 15 arranged in side-by-side relationship. The lower mold section 16 and an associated steam platen 18 are normally stationary on a base (not shown) of the press, and the upper mold section and an associated steam platen 19 are supported above the lower mold section for movement toward and away from the latter under the action of a suitable and conventional drive mechanism (not shown). The lower and upper steam platens 18 and 19 have interior passages through which steam may be circulated to heat the lower and upper mold sections.

The press 10 further comprises a conventional center bladder mechanism 23 of the upstanding bladder type. The bladder mechanism 23 includes a shaping and curing bladder 24 having lower and upper beads clamped by lower and upper bead clamping assemblies 25 and 26. The lower bead clamping assembly 25 includes as a part thereof a lower bead shaping ring 28 that defines a seat for the lower bead of the tire T. The seat for the upper bead of the tire T is formed by an upper bead shaping ring 29 which is mounted to the upper mold section 17.

The upper bead clamping assembly 26 is secured to a center post 32 and the lower bead clamping assembly 25 is mounted to an annular support member 33. By conventional mechanisms that are not shown, the center post 32 and the annular support member 33 are vertically movable relative to one another, and relative to the lower and upper mold sections as well, thereby to effect corresponding movement of the upper and lower bead clamping assemblies during loading, shaping, and stripping of a tire with respect to the mold, using conventional mold operating practices. As seen in FIG. 1, the annular support member 33 has a pair of passages 35 and 36 for circulating shaping and curing media through the interior of the bladder.

In conventional operation of the illustrated press, the upper mold section 17 initially may be in an open offset position. A green tire is placed on a loader platform (not shown) in front of the press, after which a loader (not shown) elevates the green tire and centers it above or on the lower bead ring. With the tire still held by the loader or after release by the loader, the bladder is inflated into the tire. The press is then closed, of course after the tire loader has been moved out of the way. As the press closes, pressure is applied to the interior of the bladder to shape the green tire.

After the press is fully closed, high temperature and pressure curing media, such as hot water, is circulated through the bladder to cure the tire. A conventional practice is to circulate hot water at high pressure through the bladder for a period of time to rapidly heat up the tire. Then, the curing media outlet passage is closed off while heated water continues to be supplied to the bladder at a high pressure to create a so-called hot water dead end period. After the hot water dead end period, the hot water is discharged from the bladder by high pressure steam which is supplied to the bladder for a set period of time. The pressure within the bladder is then reduced to initiate a blow down period for removal of any residual water from the interior of the bladder. At the completion of the blow-down period, the press is opened and the center bladder mechanism operated to strip the tire from the mold and then the bladder from the tire. This cycle, which may take from 5 to 60 minutes depending on the size of the tire, is then repeated for a next green tire. Cycle times for passenger and light truck tires typically range from 7 to 30 minutes.

The present invention is primarily concerned with controlling the length of cure so that all tires will be cured to the same extent in the minimum amount of time, thereby to maximize production while providing uniformly cured products. To this end, the invention provides a tire cure control system indicated generally by reference numeral 50 in FIG. 2.

The Tire Cure Control System-FIG. 2

As seen in FIG. 2, the tire cure control system 50 is designed to interface with a press controller 60 that may be a conventional mechanical timer which cycles the press through various steps during which the tire is loaded, shaped, heated and then discharged from the press. This approach to implementation of the invention lends itself to retrofitting existing presses employing conventional press controllers. It should be understood, however, that the functions of the tire cure control system 50, and the herein described methodology, may be otherwise implemented such as by integration into a press controller that may be used in place of the timer controllers presently commonly used to control press operation.

The press control system 50 may also be used with presses including one or more tire molds, such as the more conventional dual-cavity presses. In multiple cavity presses, the system will operate to ensure that the press will not open until the slower of the two curing tires has cured sufficiently to ensure complete cure upon completion of the curing process.

The tire cure control system 50 generally comprises a microwave generator/receiver unit 51 to which a plurality of microwave probes 52 and 53 are connected, optionally one or more probes for monitoring other curing parameters such as a temperature probe 57 and pressure probe 58, and a computer 59 for analyzing data received from the microwave unit and the temperature and pressure probes and for generating a control signal or signals supplied to the press controller 60.

The probes 52 and 53 are strategically located in the tire mold as schematically depicted in FIG. 2, where the probes 52 and 53 are shown in relation to the lower mold section 16. Preferably, a similar arrangement of probes are also provided in the upper mold section. The probes are strategically located in the mold so as to be in the proximity of regions of least cure in the tire, i.e., the regions of the tire which are the last to cure. The region or regions of least cure are usually a function of the product's geometry. In the case of a tire, the regions of least cure typically are at the beads and the tread shoulders.

Accordingly, the probes 52, hereinafter called bead probes, each include an elongate conductive element 63 such as a wire that extends generally parallel to the region of the mold cavity against which the bead of the tire is formed. More particularly and as shown in FIG. 3, the conductive element, which may be a flat or round wire, runs along a shallow arcuate groove 64 formed in the bead forming surface 65 of the bead ring 28 and is retained in the groove by a suitable potting compound 66, such as an epoxy, that can stand up to sand blasting of the molds for cleaning. The conductive element preferably has an arc length greater than 90°. In the illustrated embodiment, there are three bead probes 52 arranged circumferentially around the bead ring 28 with each having an arc length of about 120° whereby the bead probes collectively extend essentially the full circumferential length of the bead ring.

The ends of each bead probe 52 are connected via leads 69 to the microwave unit which includes a source of microwave energy. The microwave source may consist of a tunable nine GHz oscillator. The oscillator may drive a single microwave power amplifier which provides a nominal two watts output into a 50 ohm lead. The microwave signal generated by the unit preferably has a frequency in the range of 1–20 Ghz and more preferably is in the range of 8–12 Ghz. The microwave signal is supplied to one end of each bead probe for travel along the conductive element. As the microwave signal travels along the conductive element, it will become attenuated through dielectric interaction with the material of the tire in the region of the bead coextensive with the bead probe. Accordingly, the signal received at the other or output end of the bead probe will be attenuated as a function of the dielectric properties of the tire material which undergo change during cure. The amplitudes of the microwave signal at the input and output of each bead probe may be compared to determine the attenuation of the microwave signal. This measure of microwave attenuation is used by the computer in the hereinafter described manner to control the cure time.

Test results have indicated that microwave attenuation in rubbers containing carbon black is dominated by losses due to the electrical conductivity of the medium. Changes in conductivity during cure are apparently related to changes associated with the carbon black component. One change in the carbon black that is known to accompany cure is carbon agglomeration. It is theorized that an increase in conductivity could accompany the growth of larger carbon aggregates, thereby increasing the microwave signal loss in the medium.

In the illustrated preferred embodiment and as further shown in FIG. 4, each tread probe 53 includes a short transmitter wire 71 and a short receiver wire 72 which project into the cavity of the mold substantially perpendicularly to the adjacent cavity surface 73 of the mold. Consequently, the transmitter and receiver wires will penetrate into the tire material when the mold is closed and internal pressure is applied into the tire. Preferably, the transmitter and receiver wires are formed by stripped ends of the center conductor of respective coaxial cables 75 and 76, which cables also provide for connection of the probe to the microwave unit. The stripped ends of the two center conductors of the cables respectively form the transmitter and receiver wires which may be a ½ or ¼ length of the excitation frequency. A suitable feed passage for the cables is provided for leading the cables to the interior cavity surface of the mold and the ends of the cables preferably are secured in place by using a suitable potting compound such as an epoxy.

As seen in FIG. 4, the transmitter and receiver wires 71 and 72 preferably are located at the crown of a groove forming element 77 in the mold. This will bring the probe transmitter and receiver elements closer to the center of the tread thickness. Also, the small holes that will be left in the tire by the probe elements when the tire is removed from the mold will be located at the bottom of a groove in the tire and hence inconspicuous so as not to detract from the overall aesthetic appeal of the tread design.

A microwave signal is injected by the transmitter wire 71 into the mold cavity and is received at the receiving wire 72. The received signal will be attenuated as a function of the dielectric properties of the material through which it passes. The transmitted and received signals are then compared to determine the attenuation of the microwave signal for further processing in the computer 59.

The computer 59 uses the attenuation information to determine when to issue a press opening signal to the press controller 60. More particularly, the computer is programmed to issue a press opening signal as a function of the rate of change of microwave attenuation. Consequently, the probes must sample microwave attenuation at least at two different times so that a rate of change can be determined. Preferably, the microwave attenuation is continuously monitored to provide a steady stream of data to the computer for real time calculation of the rate of change of microwave attenuation. The rate of change of microwave attenuation may be used along with other sensed data such as temperature and pressure provided by probes 57 and 58 to control the length of the curing cycle. Sensed pressure and temperature, as well as other sensed parameters, may be used along with the rate of change of microwave attenuation to determine exactly when to issue a press opening signal. That is, the optimal time at which to initiate a press opening sequence may be a function of pressure, temperature and, most importantly, the rate of change of microwave attenuation. When the functional relationship is satisfied as determined by the computer based upon probe data, the command signal is issued.

Although the actual algorithm used may vary depending on the particular product being molded and a particular manufacturer's requirements, a fundamental requirement according to the invention is that the function at least in part be based upon the rate of change of microwave attenuation. In fact, improved results may be obtained by basing the decision on only the rate of change of microwave attenuation as measured by the bead and tread probes 52 and 53. This may be especially true in other systems for molding products other than tires and especially less complex products. The algorithm for use in curing a specific product may be optimized by those of ordinary skill in the art through appropriate experimentation and model fitting techniques well known in the art. Once the correlation is known between microwave attenuation and the state of cure, as can be determined empirically for any given rubber product and molding procedure, this correlation can be used to control the molding operation and principally optimize the curing time. In view of the observed high correlation between cure state and microwave attenuation in the 2–20% cure range in the case of typical tire compounds and constructions, attenuation data normally will be obtained in this range and then extrapolated out to determine the optimum time for the tire to be removed from the press.

The measurement of microwave attenuation is to be distinguished from measurement of changes in dielectric constant and loss tangent. Tests have shown changes in dielectric constant and loss tangent to be temperature dependent and therefore not as practical an indicator of the state of cure as compared to the present invention where the change in microwave attenuation is used as an indicator of the state of cure.

As above indicated, the tread probes 53 are located at the region of the mold cavity against which the tread shoulders are formed. In the illustrated embodiment, three such tread probes are provided, although it should be understood that fewer or more probes may be used if desired. Also, other probes may be located in proximity to other regions of the tire although strategically the probes are located in proximity to the regions of least cure.

In the illustrated tire cure control system which is designed to interface with a conventional press controller, the basic functions of the system are to measure the time rate of change of the attenuation of microwave energy propagating along and in between two sensing wires in the mold and to provide a command signal to the press controller when the measurement reaches the proper value. A "start of cycle" signal may be provided from the press controller to the system computer 59 such as via a relay contact closure, and the command signal provided by the system can be interfaced to the press controller in a suitable manner.

In general, the sequence of operations and functions of the illustrated system may be as follows. The system will receive a signal from the press controller indicating that the cure cycle has started. The system will monitor the slope of the microwave attenuation versus time to determine when to issue the command signal to initiate opening of the press, at which point the system will send a signal to the press controller to initiate a press opening sequence. The system may also monitor the press steam/water inlet and outlet temperatures and compute cure equivalents based on these measurements to permit correlation with the microwave attenuation slope data. This will also provide an independent check to prevent extreme undercures and overcures in the case of malfunction of the microwave-based probes. Provision also may be made for inputting the tire type to the cure monitor system when a mold change is made so that an appropriate algorithm may be selected for such tire type. The use of a microcomputer for process control allows exceptional flexibility for the system, including modification of the data acquisition and processing algorithms and the opportunity for networking and centralized control from a host computer. Also, by the selection of certain preset conditions, an operator can adjust the process to different types of rubber compounds.

In some curing presses, such as the herein described passenger tire press, the press cycle includes a first stage during which high pressure steam is supplied to the interior of the bladder inside the green tire to shape and heat the green tire for about 2 minutes. This is followed by a second stage during which hot media such as hot water is circulated at high pressure through the bladder inside the green tire for about 4 minutes. During a third stage, outward flow of the hot water from the bladder is shut off while continuing to supply hot water to the bladder thereby to maintain high pressure and high temperature conditions for about 2–3 minutes. In a fourth stage the press undergoes a press opening sequence during which the hot water is removed from the bladder and the mold is opened to permit removal of the tire, this stage lasting about 3 minutes. These times will generally be longer for larger tires.

The first and second stages may be of fixed duration as is conventional. However, in accordance with the present invention, the duration of the third stage is based on a selected characteristic of the tire measured during the curing thereof, i.e., the rate of change of attenuation of a microwave signal passed through the tire. Accordingly, monitoring of microwave signal attenuation may be accomplished by taking at predetermined different times two measurements during the second stage to determine the rate of change. From those measurements the state of cure can be determined and the duration of the third stage can be adjusted accordingly. Typically the duration of the fourth stage will not be varied as the press opening sequence takes a certain amount of time. Preferably, as above indicated, more than just two measurements are taken. Instead, it is more desirable to continuously monitor microwave attenuation from the start of the curing cycle until at least the end of the second stage and even into the variable length third stage. From the accumulated data, the state of cure may be ascertained at end of the second stage or other selected time to determine when to issue a command signal to the controller that will control the time that the fixed length press opening sequence is to commence.

Figure 5A:
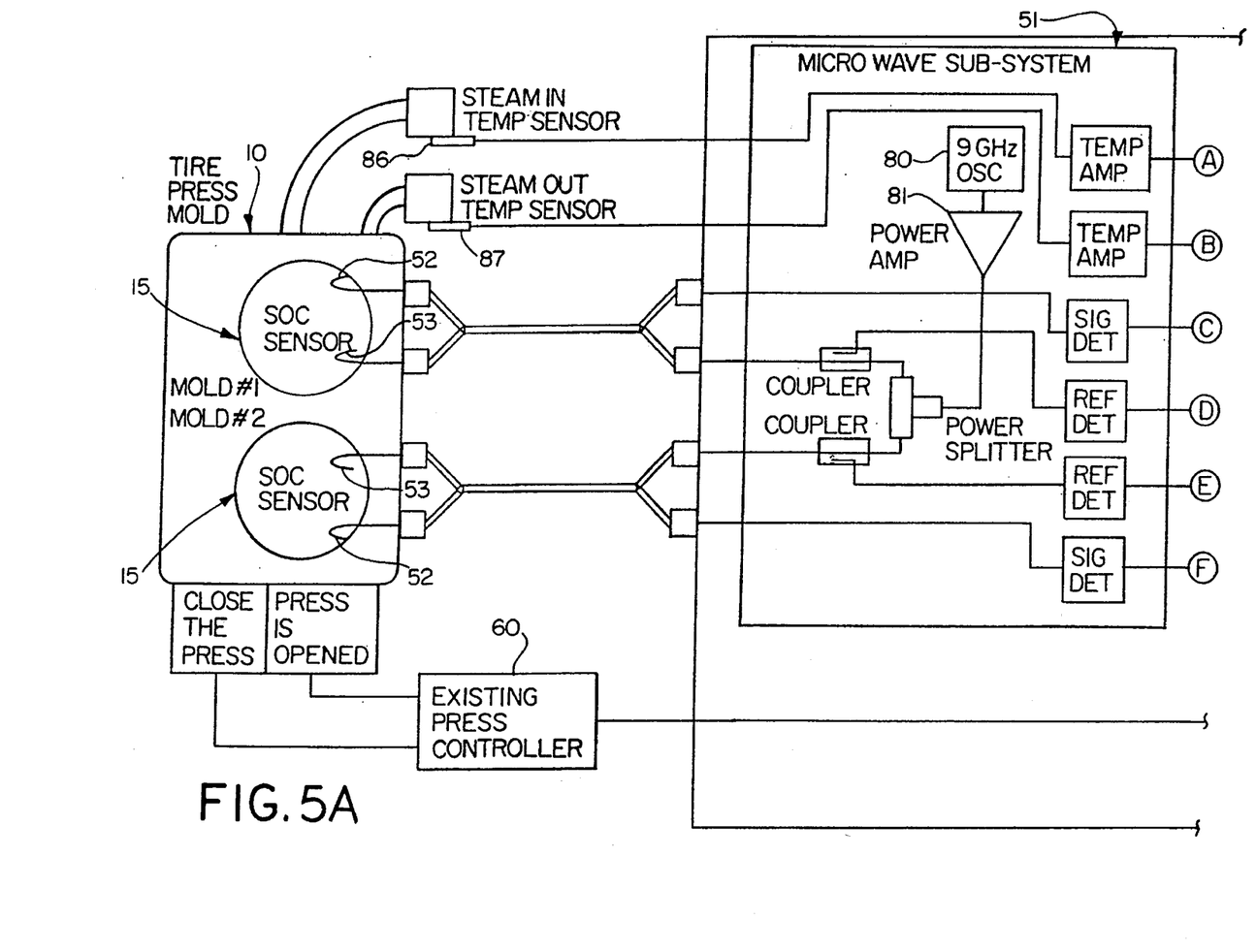
FIGS. 5A and 5B are broken continuations of a diagrammatic illustration of a control system according to the invention.
Figure 5B:
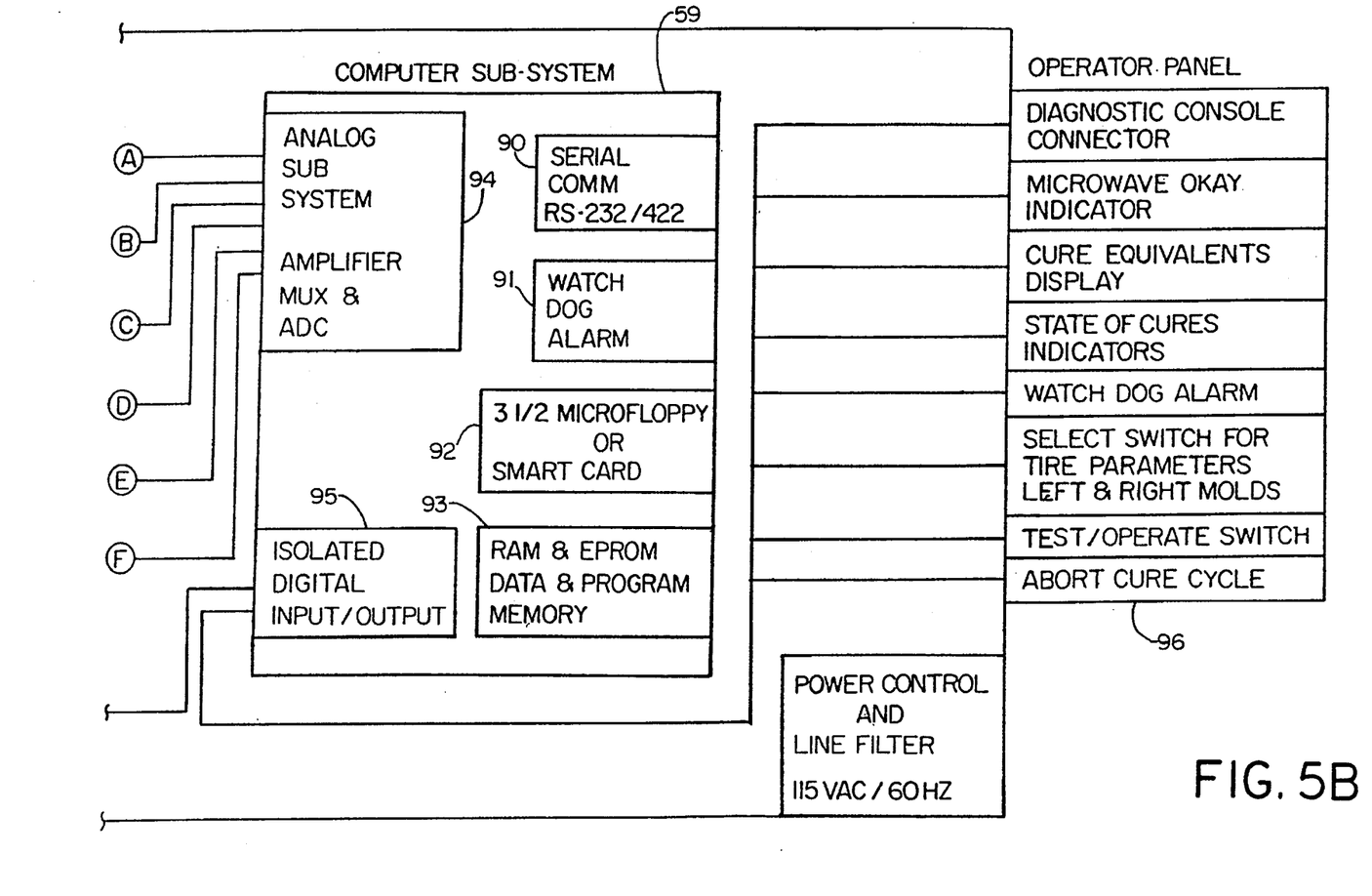

Referring now to FIGS. 5A and 5B, further details of a practical control system are diagrammatically shown. As above indicated, a 9 GHz oscillator 80 may be used to drive a single power amplifier 81, which provides a nominal 2 watts output. The output of the amplifier is split with nominally half of the power going to each mold 15 of the press 10. A reference detector may be employed for compensation of microwave power drifts, should they occur. The microwave bead and tread sensors 52 and 53 are appropriately interfaced to the computer 59. As shown, probes 86 and 87 may also be provided to measure the temperature of the steam going in and out of the press, if desired. The mold temperature and pressure sensors, although not illustrated in FIGS. 5A and 5B, may also be employed.

The computer 59 may include an array of standard components and interfaces including serial communications 90, a watch dog alarm 91, floppy disc drive or smart card reader 92, RAM and EPROM data and program memory 93, analog/digital and multiplexing circuitry 94, and isolated digital input/output 95 for interfacing with the press controller and an operator panel 96.

Although the invention has been shown and described with respect to certain preferred embodiments, equivalent alterations and modifications will no doubt occur to others skilled in the art upon the reading and understanding of this specification. For example, the invention may be applied to other types of tire presses including segmented mold presses and to other types of molds and molding processes in general. Moreover, other means and methods may be used to effect cure of the rubber product. For example, in the context of molding tires, steam/inert gas, inert gas/electric and other tire press heating and shaping techniques may be used.

In addition, the invention, although particularly described in relation to the curing of tires containing a significant quantity of carbon black, may be applied to cure tires or, more generally, rubber compounds containing other reinforcing agents or fillers including, for example, silica, zinc oxides, calcium carbonates, calcium silicates, silicon dioxides, clays, magnesium carbonate, etc., at usual quantities of 1–50 parts of reinforcing agent per 100 parts by volume of rubber. However, the invention, as above described, has particular application to curing of rubber compounds containing carbon black as a primary reinforcing agent.

The present invention includes all such equivalent alterations and modifications, and is limited only by the scope of the following claims.

What is claimed is:

1. A method of controlling the cure of a rubber compound containing a reinforcing agent or filler, comprising the steps of closing a mold with the rubber compound therein, applying heat to the rubber compound to initiate curing of the rubber compound, passing a microwave signal through the rubber compound, measuring the attenuation of the microwave signal, calculating from the microwave attenuation measurements the rate of change of microwave attenuation, using the rate of change of microwave attenuation to determine when to issue a press opening signal, and automatically initiating a press opening sequence in response to the press opening signal.

2. A method as set forth in claim 1, wherein the using step includes using the rate of change of microwave attenuation to determine a remaining period of time before issuing the press opening signal and then issuing the press opening signal upon elapsing of the remaining period of time.

3. A method as set forth in claim 1, wherein the voltage attenuation of the microwave signal is measured.

4. A method as set forth in claim 1, wherein the current attenuation of the microwave signal is measured.

5. A method as set forth in claim 1, wherein a plurality of probes are used to measure the attenuation of respective microwave signals passing through the rubber compound at respective different locations in the mold, and the using step includes using the probe output that exhibits the greatest rate of change relative to the other probes when determining when to issue the press opening signal.

6. A method as set forth in claim 1, wherein the rubber compound being cured includes carbon black as a reinforcing agent.

7. A method of vulcanizing a rubber tire in a closed mold having a generally toroidal mold cavity wherein a green tire is expanded in the mold by supplying a pressure fluid to the interior of the green tire, comprising the steps of:

in a first stage, supplying high-pressure steam to the interior of the green tire to shape and heat the green tire;

in a second stage, circulating hot media through the interior of the green tire by passing the hot media into and out of the interior of the green tire;

in a third stage, shutting off outward flow of the hot media from the interior of the green tire while supplying the hot media to the interior of the green tire; and in a fourth stage, removing the hot media from the interior of the tire and opening the mold to permit removal of the tire; and wherein the first and second stages are of fixed duration and the duration of the third stage is based on a selected characteristic of the tire measured during the curing thereof, and wherein the selected characteristic is the rate of change of attenuation of a microwave signal passed through the tire.

8. A method as set forth in claim 7, wherein a plurality of probes are used to measure the attenuation of respective microwave signals passing through the tire at respective different locations in the mold, and the using step includes using the probe output that exhibits the greatest rate of change relative to the other probes when determining when to issue the press opening signal.

9. In a system for vulcanizing a rubber product containing a reinforcing agent or filler in a closed mold, comprising at least one microwave probe proximate the surface of the mold cavity and having an input and an output, means for applying a microwave signal to the input of said probe, means connected to the output of said probe for measuring the microwave signal at the output of said probe, and means for comparing the amplitudes of said microwave signal at the input and output of the probe and for calculating the rate of change of the attenuation of the microwave signal, whereby the rate of change of the attenuation of the microwave signal is determined for use in determining the state of cure of the rubber product.

10. A system as set forth in claim 9, for vulcanizing a rubber tire in a closed mold having a generally toroidal mold cavity, wherein the probe includes an elongate conductive element extending generally parallel to the region of said mold cavity against which a bead of the tire is formed.

11. A system as set forth in claim 10, wherein the elongate conductive element has an arc length greater than 90°.

12. A system as set forth in claim 9, for vulcanizing a rubber tire in a closed mold having a generally toroidal mold cavity, wherein the at least one microwave probe includes a plurality of tread probes disposed in the region of the mold cavity against which the tread of the tire is formed.

13. A system as set forth in claim 12, wherein each tread probe includes a pair of wires proximate the surface of the mold cavity, and the means for applying is connected to one of the pair of wires and the means for measuring is connected to the other one of the pair of wires.

14. A system as set forth in claim 13, wherein the wires of each tread probe extend into the mold cavity in a direction substantially perpendicular to the surface of the mold cavity.

15. A system as set forth in claim 9, wherein the probe includes at least one wire potted in a groove formed in the surface of the mold cavity.

16. A method of controlling the cure of a rubber compound containing a reinforcing agent or filler, comprising the steps of closing a mold with the rubber compound therein, applying heat to the rubber compound to initiate curing of the rubber compound, measuring a characteristic of the rubber compound having relation to the state of cure of the rubber compound by passing a microwave signal having a frequency of at least 1 Ghz through the rubber compound, determining from the measured characteristic an optimal time to initiate a press opening sequence, and automatically initiating a press opening sequence at the optimal time, and wherein the measured characteristic is the rate of change of attenuation of the microwave signal passed through the tire.

17. A method as set forth in claim 16, wherein the rate of change of attenuation is monitored in the 2–20% cure range, and the resultant data is used to calculate the optimal time to initiate a press opening sequence.

18. A method as set forth in claim 16, wherein the rubber compound being cured includes carbon black as a reinforcing agent.

19. A non-destructive quality assurance method for determining the state of cure of a rubber product containing a reinforcing agent or filler during curing thereof in a mold comprising the steps of (a) passing a microwave signal through the rubber product, (b) measuring the attenuation of the microwave signal, (c) calculating from the microwave attenuation measurements the rate of change of microwave attenuation, and (d) using the rate of change of microwave attenuation to obtain an indication of the state of cure of the rubber product.

\* \* \* \* \*